March 31, 1970   W. JANSA ET AL   3,503,599
MOUNTING FOR METALLURGICAL CONVERTER Filed Aug. 11, 1967   2 Sheets-Sheet 1

Inventor
WOLFGANG JANSA
SIEGFRIED STRESEMANN
GÜNTER SCHMITZ

By McGlew and Toren
ATTORNEYS

United States Patent Office 3,503,599
Patented Mar. 31, 1970

3,503,599
MOUNTING FOR METALLURGICAL CONVERTER
Wolfgang Jansa, Moers-Asberg, Siegfried Stresemann, Rheinhausen, and Günter Schmitz, Rumeln-Kaldenhausen, Germany, assignors to Demag Aktiengesellschaft, Duisburg, Germany
Filed Aug. 11, 1967, Ser. No. 660,002
Claims priority, application Germany, Aug. 16, 1966, D 50,857
Int. Cl. C21c 5/46, 5/50
U.S. Cl. 266—36        11 Claims

ABSTRACT OF THE DISCLOSURE

A mounting for a metallurgical converter includes a first mounting pin which advantageously carries the tilt drive gear and which is rotatably mounted in an axially fixed position. A second driving pin is mounted opposite the first at a spaced location therefrom and may be axially moved toward and away from said first pin in its supporting bearing in order to permit the placement and removal of a converter between the pins. Each pin includes end flanges with both horizontal and vertical projections which interengage in corresponding horizontal and vertical recesses defined on the exterior surface of the converter to support the converter for rotatable pivotal or tilting movement.

A further feature of the construction is the provision of members which extend around each side of the converter and interconnect the supporting flange portion of the first pin with the supporting flange portion of the second pin on each side and top and bottom thereof in order to provide an articulated joint so that the ends and the bearings therefor will be able to absorb all frictional forces acting on the pins in the event of a change in volume of the converter due to temperature changes.

SUMMARY OF THE INVENTION

This invention relates in general to metallurgical equipment and in particular to a new and useful tilt mounting for a metallurgical converter permitting engagement and disengagement of the converter vessel and also having means for absorbing stresses due to expansion and contraction of the vessel.

Converters at the present time are usually equipped with a carrying ring which is formed with oppositely extending diametrically arranged pins which are supported in rotatable bearings. With such a construction the vessel, the carrying ring and the pins form a single unit. The present invention is an improvement over such a construction inasmuch as it provides a tilt mounting for a converter which permits engagement and/or removal of the converter on two pin members which are journalled for rotation in suitable bearings. The pin members are mounted on separate bearings with one being axially fixed and the other being movable toward and away from the other and with each being arranged separately from the vessel. The inwardly facing ends of the pins are provided with flanged or widened portions or shields which carry claws or claw rings which are adapted to engage in similarly formed recesses defined in the converter vessel in order to provide adequate horizontal and vertical support for the vessel between the pins for tilting movement upon rotation of the pins. For this purpose shields are provided with both horizontal and vertical power transmission surfaces. Such a construction permits the transmission of all forces and the bearing media can be selected so that the vessel can expand radially due to the influence of heat. However, the pin bearings must then absorb the forces resulting from such radial movements.

In accordance with a further feature of the invention, the pins which are formed separately from the vessel and separately rotatably mounted are interconnected after the installation of the vessel therebetween by means of tension and compression rods or carriers which act to transmit the forces exerted on the pins due to radial expansion or retraction of the vessel from one pin to the other. The forces are thus absorbed between the two pin shields and are not transmitted to the bearings themselves.

This design results in important advantages. First of all, the design is simple, and it is easier to construct the pins, the bearings for the pins, and the vessel as separate elements rather than to weld the supporting ring and the pins directly to the vessel. In addition, the vessel may be transported by itself separate from the pins and the shields and it may be manipulated much easier than a vessel having the encircling ring and the pin protruding from each side. In addition, disassembly of the vessel which may become necessary for the purposes of replacement is much easier with this design than with the traditional design. Because it is possible to eliminate the supporting ring, the total supporting space which is required for the vessel may be reduced since the shields or formations on the inner ends of the pins may engage directly against the side walls of the vessel. The mounting is such that a change in size of the converter vessel may be easily accomplished by merely extending the operative position of the axially movable pin. Additional advantages are achieved with the construction in respect to the temperatures of operation and in respect to the driving connections for tilting the vessel.

According it is an object of the invention to provide an improved mounting for a converter of a metallurgical plant which includes first and second rotatable support pins which are mounted in their respective bearings and include opposing end faces having means thereon which are engageable with the wall of a converter vessel to support the vessel for rotational tilt driving and which also includes means for interconnecting the opposed ends of the pin members in order to provide for a uniform stress distribution between the pin members during expansion and contraction of the vessel.

A further object of the invention is to provide a mounting for the tilt drive of a converter vessel which includes opposed rotatable supporting pins, one of which is fixed axially and the other of which may move axially, and each of which carries end face formations which interengage in horizontal and vertical directions with complementary formations on the side of a converter vessel and which further includes holding arms which are articulated to each pin and extend between opposed pins on each side of the vessel for the purposes of distributing forces from one pin to the other due to any changes in temperature in the vessel.

A further object of the invention is to provide an arrangement for supporting metallurgical vessels in a metallurgical plant which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

DETAILED DESCRIPTION

Figure 1:
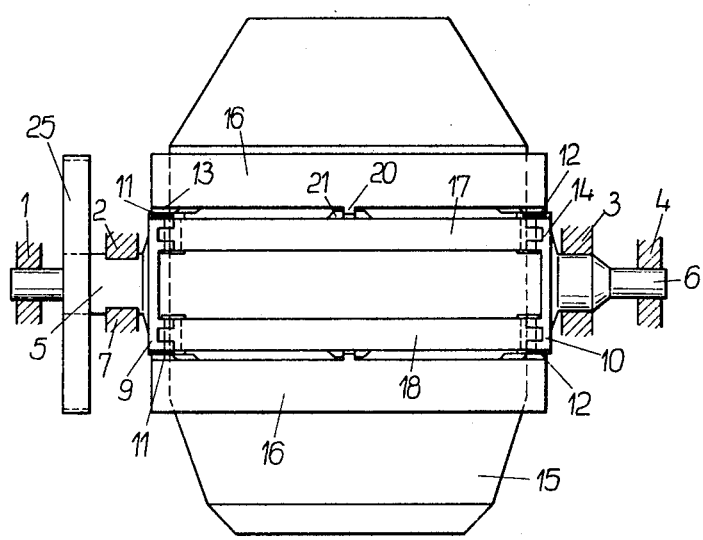
FIG. 1 is a side elevational view of a converter and tilt mounting therefor constructed in accordance with the invention.

Referring to the drawings in particular, the invention embodied therein comprises a mounting for a converter 15 which permits the ready attachment and removal of the converter and the engagement of the converter for controlled tilting thereof. The mounting includes first and second opposed supporting pins 5 and 6. The first supporting pin 5 is mounted in spaced bearings 1 and 2 in a manner rotatably supporting the pin but preventing axial displacement thereof. The second pin 6 is rotatably supported in the bearings 3 and 4 in a manner such that this pin may be moved axially. The pin 5 is provided with a shield or flanged end portion 9 and the pin 6 is provided with a shield or widened end portion 10 arranged in opposed spaced relationship to the shield 9. Each shield 9 and 10 is provided with vertical bearing surfaces 13 and 14, and, in the various positions of the converter vessel 15, it is supported by interengaging projections 12 on a vessel ring 16 and recesses 32 on shields 9 and 10. For this purpose, the vessel 15 is advantageously provided with claw rings or vessel rings 16 which are rigidly connected to the outside of the vessel and which include the projections 12 having vertical bearing surfaces 13' and 14' which bear against corresponding surfaces 13 and 14 of recesses 32 at the top and bottom of the respective shields 9 and 10.

In the event of radial expansion of the vessel 15, forces are exerted on horizontal (in respect to the upright vessel position) bearing surfaces 11' and 12' of the ring projections 12 and in the shield recesses. 32. These forces also act in radial and axial directions of the pins 5 and 6 due to friction. In order that the forces will not be transmitted to the bearings, the shields 9 and 10 are interconnected by elements or holding arms 17 and 18 which are arranged to interconnect the tops and bottoms of each of the respective shields 9 and 10 on each side of the vessel 15. The radial forces which act, for example, on the shield 9 will therefore be transmitted to the shield 10 via the two arms 17 and 18 without affecting the bearings 1 and 2.

In order to insure that the vessel expands in both directions and does not shift unilaterally, centering devices are provided for centering the vessel 15 in respect to the arms 17 and 18. These centering devices in the embodiment indicated take the form of a protrusion 20 formed on the ring 16 which engage stops 21 carried on the arms 17 and 18.

The arms 17 and 18 are connected to the respective shields 9 and 10 by articulated joints comprising pivot bolt member 22. The arms 17 and 18 extend substantially horizontally in the non-tilted position and are curved around the side of the cylindrical vessel 15 indicated. The bolts 22 are of such a nature that they may be removed to permit opening of the arms and the withdrawal of the converter 15 from between the pins 5 and 6. The articulated mounting of the arms 17 and 18 provides the advantage that the pins and connecting means form no rigid system and, in addition, they permit the easy assembly and disassembly of the related parts.

The drive of the converter 15 is effected through a gear 25 which is carried on the pin 5.

Figure 2:
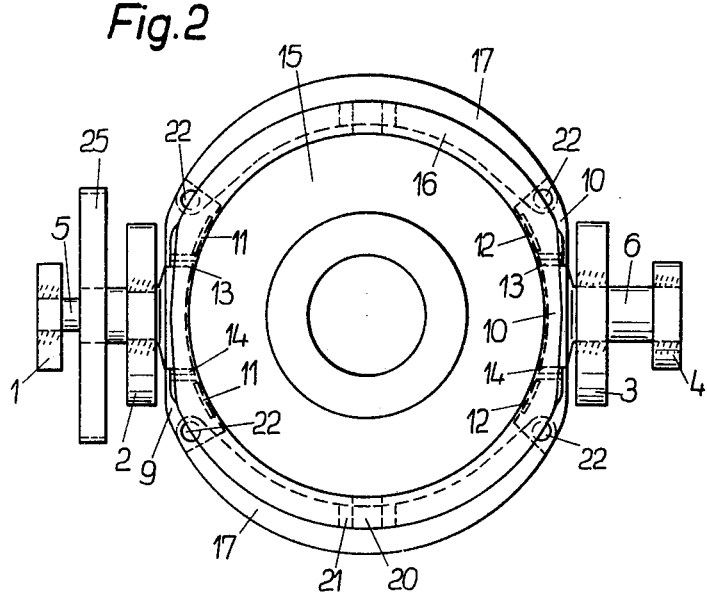
FIG. 2 is a top plan view of the converter indicated in FIG. 1.
Figure 3:
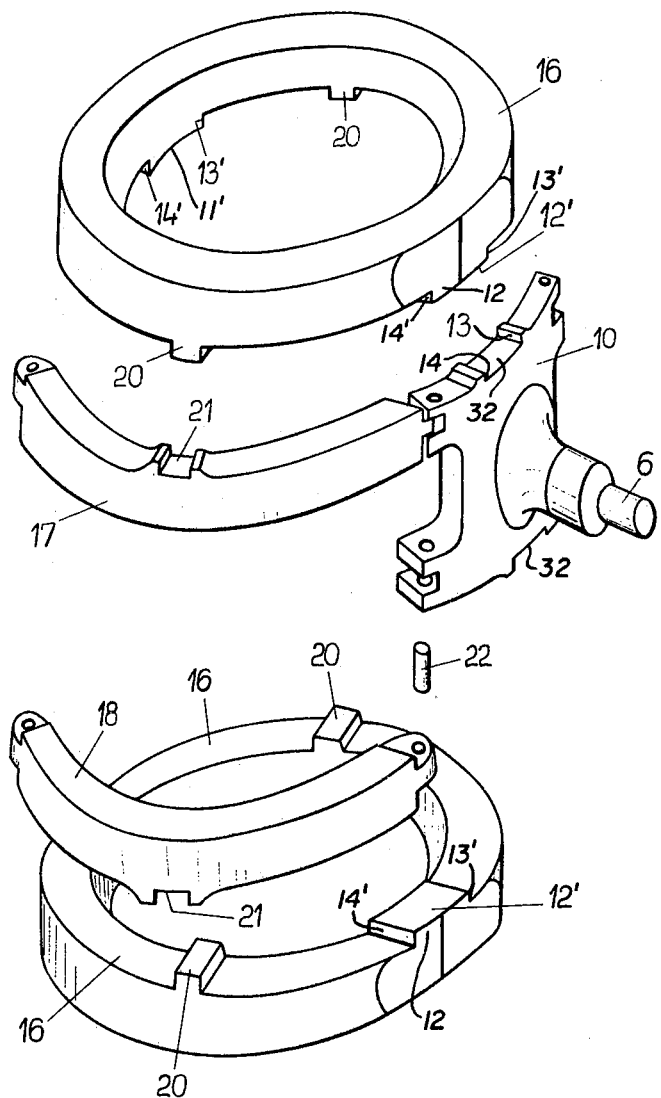
FIG. 3 is an exploded view.

As indicated in FIG. 2, the outside wall of the vessel 15 is spaced from the bearings 2 and 3 only by the width of the shields 9 and 10 so that an unusually large diameter vessel can be accommodated between the bearings 1 and 2 and 3 and 4.

While a specific embodiment of the invention has been shown and described in detail to illustrate the application of the inventive principles, it will be understood that the invention may be embodied otherwise without departing from such principles.

What is claimed is:

1. A mounting for a normally upright but tiltable metallurgical vessel, comprising first and second ring elements which are adapted to be secured around the periphery of the vessel at vertically spaced locations in respect to the upright position of the vessel, first and second axially spaced opposed support pins adapted to be rotatably supported on respective sides of the vessel and each terminating in an end facing the vessel having first and second opposite extending bearing surfaces engageable with the respective first and second ring elements, said first and second ring elements and said first and second bearing surfaces having respective interengageable projection and recess portions providing interengagement between said ring elements and said first and second pins for supporting the vessel for rotatable tilting movement with said first and second pins, and means for interconnecting said first and second pins adapted to extend around the vessel when the vessel is supported by said ring elements between said first and second pins and for absorbing forces acting upon the pins when the volume of the vessel changes.

2. A mounting according to claim 1, including means for centering the vessel between said means interconnecting said pins.

3. A mounting according to claim 1, wherein each of said first and second pin ends comprises a shield having horizontal and vertical bearing surfaces engageable with complementary surfaces of the metallurgical vessel.

4. A mounting according to claim 3, wherein said means for interconnecting said pins include tension and compression carrier arms pivotally connected to each of said shields.

5. A mounting according to claim 4, including means for centering said carrier arms in respect to the vessel.

6. A mounting, according to claim 1, wherein the end of each of said support pins comprises a substantially rectangular shield, said means for interconnecting said first and second pins comprising a carrier arm for each side of said each having one end pivotally connected to the shield of said first pin and extending around said vessel adjacent said first ring element and an opposite end pivotally connected to the shield of said second pin, and a second carrier arm for each side of the vessel having one end pivotally connected to said shield of said first pin and adapted to extend around the associated side of the vessel and pivotally connected at its opposite end to the shield of said second pin and located adjacent said second ring element.

7. A mounting, according to claim 1, said interconnecting means including first and second carrier arms on each side of said vessel extending between respective said first and second pins.

8. A mounting, according to claim 1, including first and second bearing means for rotatably supporting respective first and second support pins, said first bearing means rotatably supporting said first support pin in a manner preventing axial displacement thereof.

9. A mounting according to claim 8, including gear means connected to said first pin for drivingly connecting said pin for rotation to affect tilting of the vessel.

10. A mounting, according to claim 1, wherein said means for interconnecting said first and second pins includes at least one arm extending between the ends of said first and second pins and being pivotally connected to the respective ends of said first and second pins.

11. A mounting, according to claim 10, wherein said ends of said pins comprise a substantially rectangular shield and wherein there is a connecting arm extending between the shield of said first and second pins adjacent the tops and the bottoms thereof in respect to the upright position of the vessel.

References Cited

UNITED STATES PATENTS

| | | | |
|---|---|---|---|
| 3,455,545 | 7/1969 | Campbell | 266—36 |
| 2,976,090 | 3/1961 | McFeaters. | |
| 3,239,206 | 3/1966 | Puxkandl | 266—39 X |
| 3,337,205 | 8/1967 | Puxkandl. | |
| 3,376,029 | 4/1968 | Menu. | |

J. SPENCER OVERHOLSER, Primary Examiner

J. S. BROWN, Assistant Examiner